(12) United States Patent
McGilliard (10) Patent No.: US 10,546,309 B2
(45) Date of Patent: Jan. 28, 2020

(54) COMPUTER PROCESSES FOR PREDICTING MEDIA ITEM POPULARITY

(71) Applicant: Amazon Technologies, Inc., Seattle, WA (US)

(72) Inventor: Christopher Lon McGilliard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 15/669,830

(22) Filed: Aug. 4, 2017

(65) Prior Publication Data

US 2017/0330209 A1    Nov. 16, 2017

Related U.S. Application Data

(62) Division of application No. 14/034,430, filed on Sep. 23, 2013, now Pat. No. 9,753,988.

(51) Int. Cl.

| | |
|---|---|
| *G06F 16/00* | (2019.01) |
| *G06Q 30/02* | (2012.01) |
| *G06F 16/9535* | (2019.01) |
| *G06F 16/2457* | (2019.01) |
| *H04N 21/442* | (2011.01) |
| *G06F 16/68* | (2019.01) |
| *G06F 16/335* | (2019.01) |

(52) U.S. Cl.
CPC ... *G06Q 30/0202* (2013.01); *G06F 16/24578* (2019.01); *G06F 16/9535* (2019.01); *G06Q 30/0201* (2013.01); *H04N 21/44204* (2013.01); *G06F 16/337* (2019.01); *G06F 16/68* (2019.01)

(58) Field of Classification Search
CPC ............. G06F 16/9535; G06F 16/24; G06F 16/24578; G06F 16/635; G06Q 30/0631; G06Q 30/0202; G06Q 30/0282; H04N 21/44204
See application file for complete search history.

(56) References Cited

U.S. PATENT DOCUMENTS

| | | | |
|---|---|---|---|
| 6,049,778 | A | 4/2000 | Walker et al. |
| 6,912,505 | B2 | 6/2005 | Linden et al. |
| 7,536,322 | B1 | 5/2009 | Selinger et al. |
| 7,685,074 | B2 | 3/2010 | Linden et al. |
| 8,175,989 | B1 | 5/2012 | Gopinath et al. |

(Continued)

*Primary Examiner* — Merilyn P Nguyen
(74) *Attorney, Agent, or Firm* — Knobbe, Martens, Olson & Bear, LLC (57) ABSTRACT

Systems and methods are disclosed that identify users of a media distribution system that tend to consume popular media items prior to such media items gaining popularity. For example, a set of early adopters may be identified that tend to listen to music associated with particular artists before such artists become popular. The systems and methods disclosed may also utilize identified early adopters to determine relatively obscure or unpopular media items (or creators thereof) that are likely to become popular in the future. Illustratively, an obscure artist whose content is commonly consumed by early adopters can be identified as potentially achieving widespread popularity in the future. These media items predicted to become popular or media item creators may then be recommended to other users of the media distribution system.

19 Claims, 4 Drawing Sheets

(56) References Cited

U.S. PATENT DOCUMENTS

| | | | |
|---|---|---|---|
| 8,195,522 B1 * | 6/2012 | Sonne | G06Q 30/06 705/26.2 |
| 8,260,656 B1 | 9/2012 | Harbick et al. | |
| 8,452,797 B1 * | 5/2013 | Paleja | G06Q 30/02 707/767 |
| 8,468,164 B1 * | 6/2013 | Paleja | G06F 16/9535 707/767 |
| 9,639,848 B1 | 5/2017 | Belle et al. | |
| 2002/0082901 A1 | 6/2002 | Dunning et al. | |
| 2003/0135513 A1 | 7/2003 | Quinn et al. | |
| 2004/0260600 A1 | 12/2004 | Gross | |
| 2006/0010029 A1 | 1/2006 | Gross | |
| 2008/0077568 A1 | 3/2008 | Ott | |
| 2008/0097955 A1 | 4/2008 | Kapur | |
| 2010/0121857 A1 | 5/2010 | Elmore et al. | |
| 2013/0117349 A1 | 5/2013 | Burnette et al. | |
| 2013/0173368 A1 | 7/2013 | Boutin et al. | |
| 2015/0294377 A1 * | 10/2015 | Chow | G06Q 30/0263 705/347 |

\* cited by examiner

COMPUTER PROCESSES FOR PREDICTING MEDIA ITEM POPULARITY

BACKGROUND

Digital encoding has rapidly expanded the influence of consumable media such as music, books, and video, by decreasing development and production costs while increasing accessibility of end users. For example, global computer networks, such as the internet, allow media creators to collaborate and publish media content without reliance on traditional distribution channels. These networks also allow users to easily locate and consume desired media at their convenience. For example, network-based services now exist that enable users to digitally stream or download music, books, and video for consumption on the user's computing device.

Sales, consumption, and popularity of media items often experience a large amount of inequality, with a small number of media items being very prominent and a larger number of media items being relatively obscure. In addition, the popularity of a given media item may be self-influencing. For example, users may be exposed to a popular song frequently (e.g., via radio, TV, movies, etc.), thereby increasing the song's prominence. Meanwhile, users may rarely be exposed to an unknown song, ensuring the song remains obscure. Given the extensive selection of songs available, it may be difficult or impossible for users to locate obscure media content without knowing the specific details of the media content. Such difficulty negatively affects users, media producers, and media content providers by limiting users' ability to acquire, purchase or consume desirable media content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Aspects of the present disclosure generally relate to systems and computerized processes for identifying users that tend to repeatedly acquire or consume media items, such as media items created by a specific author or artist, prior to such media items (or the creators of such media items) becoming widely recognized or popular. Illustratively, media items may include various types of works such as songs, movies, books, videos, or any other consumable media content. Creators of media items may include artists, producers, authors, editors, engineers, technicians, or other parties associated with creation, production, or distribution of media. Generally, users who tend to consume media items prior to such items becoming popular may be referred to herein as "early adopters." As will be described in more detail below, interaction information regarding a large number of users (e.g., all users of a network-based media distribution system) may be analyzed to determine a subset of those users that consistently interact with media items prior to those items becoming popular. Further, aspects of the present disclosure relate to computer-implemented algorithms that utilize acquisition and consumption histories of these early adopters to identify relatively unknown or obscure media items or media item creators that have a high potential for becoming popular in the future. Specifically, as will be described in more detail below, computer-implemented algorithms may be used to gather a high volume of early adopter interaction data and to process this data to determine correlations between the interactions of multiple early adopters. These correlations may then be ranked according to a scoring algorithm to predict obscure media items that are likely to become popular in the future. Still further, aspects of the present disclosure relate to surfacing these identified media items to users of a computer-implemented content service, such as a network-based media distribution system. Illustrative, media items may be surfaced to users by providing recommendations of media items predicted to become popular or media item creators to users of the computer-implemented content service.

Specifically, a computer-implemented media content service such as a network-based streaming music service, is disclosed that identifies those users that tend to acquire or consume media items (such as media items associated with a particular media item creator) prior to those media items becoming widely popular (e.g., "early adopters" of the media items). In one embodiment, the media content service identifies early adopters based on acquisition and consumption data of current or past popular media items. For example, the media content service may aggregate information regarding users that consumed a media item prior to the media item becoming popular. Thereafter, the media content service may score each user to determine the likelihood that the user is an early adopter. Illustratively, a user who consumed one media item prior to that item becoming popular may be less likely to represent an early adopter than a user who has consumed many media items prior to those items becoming popular. Various additional metrics for scoring users will be discussed below, including metrics based on the time period during which a user consumed or acquired a now-popular media item and metrics based on the historical level of interest of a user in a now popular media item.

After identifying a number of early adopters, the media content service is enabled to determine commonalities among those early adopters, such as obscure media items that tend to be consumed by the early adopters (e.g., songs by a particular artist). Because early adopters have been identified based on their history of early interaction with media items that later become popular, a relatively large number of early adopters consuming obscure media items by a single artist may be indicative of future popularity of the artist.

In one embodiment, the media content service may score artists whose songs are consumed or acquired by early adopters based, for example, on the number of early adopters that have acquired or consumed the artist's songs and/or on the interest level of those early adopters in the artist's songs. Thereafter, the media content service can utilize the determined song scores to provide recommendations to users regarding artists predicted to become popular. For example, the media content service may provide recommendations to users of "up and coming" artists identified based on the determined artist scores. Such recommendations can be provided, for example, via applications executing on user computing devices (e.g., web browsers or mobile applications), electronic message (e.g., electronic mail, short message service, instant message) or other transmissions. By interacting with such recommendations, users are enabled to acquire and/or consume songs by the recommended artist. As a further example, the media content service can provide a "playlist" including songs by a number of identified artists, and enable users to consume each song within the playlist.

Accordingly, the systems and methods provided herein enable a content service or other entity to identify unknown or obscure media items (e.g., songs, artists, etc.) that are likely to become popular in the future. The systems and methods provided herein further enable a content service or other entity to surface to users media items predicted to become popular, thereby increasing the diversity of media consumed by users, increasing user satisfaction with the media content service, and increasing revenue to both the content service and media creators.

While embodiments of the present disclosure are generally described with reference to musical media items or creators thereof, the systems and methods provided herein can be utilized with respect to any consumable media, including books, articles, movies, and videos. Aspects of the present disclosure may be particularly suited to environments where a large inequality in popularity between media items exists, such as amateur and user-created video submission sites. For example, aspects of the present disclosure can be utilized to determine a video which is likely to "go viral" (e.g., gain a mass popularity) in the future.

Further, while embodiments of the present disclosure are generally described with reference to individual media items or creators thereof, the systems and methods provided herein can also be utilized with respect to groupings of media items or media item creators, such as albums, playlists, bands, collaborative groups of artists, record labels, etc.

Still further, while embodiments of the present disclosure are generally described with respect to a media distribution service, the systems and methods provided herein may be utilized by any system or service capable of collecting interaction information from a user base. For example, in some instances, embodiments of the present disclosure may include or be utilized by a media information system configured to interact with stand-alone applications on a number of user computing devices. Illustratively, such stand-alone applications may include media player or manager applications on the user device, and such a media information system may be a network-based service which interacts with the stand-alone applications to provide information regarding media items.

Figure 1:
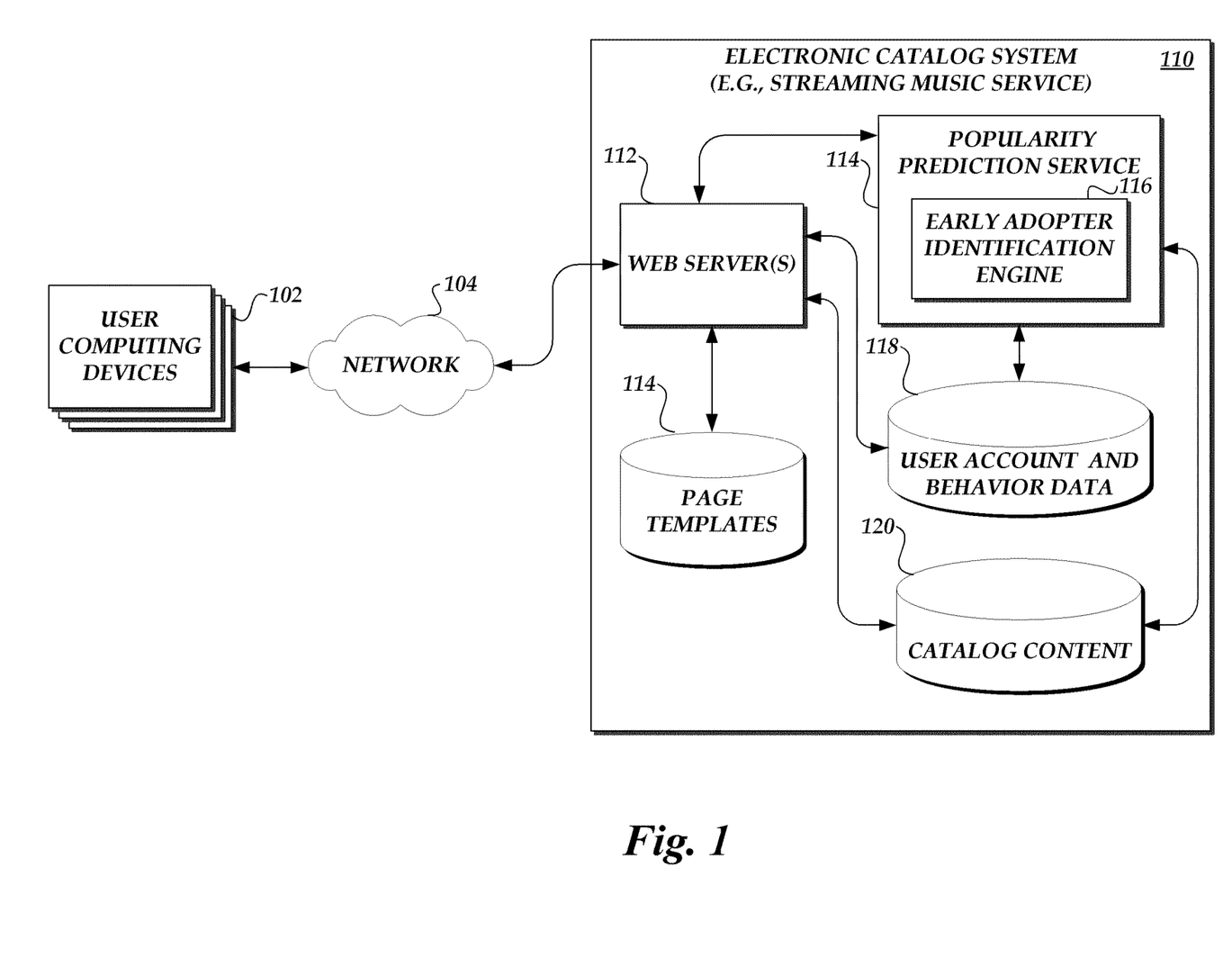
FIG. 1 schematically illustrates an embodiment of an electronic catalog system that determines early adopters of popular media items based on the acquisition and consumption history of the early adopters. The electronic catalog system can further determine media items that are likely to become popular in the future based on habits of the early adopters. Moreover, the electronic catalog system can provide recommendations to users based on media items that are predicted to become popular in the future.

FIG. 1 schematically illustrates one embodiment of an electronic catalog system 110 that implements the above and other features. The electronic catalog system 110 may be implemented as a computerized system that comprises multiple programmed computing devices (e.g., web server machines, application servers, storage servers, load balancers, etc.) that communicate over one or more networks. The electronic catalog system 110 hosts a web site or other network-based interactive service that provides functionality for users to browse an electronic catalog of media items, such as music items, that are available for consumption and/or acquisition. Illustratively, users of such a web site may be enabled to download media items for later consumption, to consume media items directly from the electronic catalog system 110 (e.g., by streaming the media item), or both. Although described in the context of a web site, the inventive features described herein can also be implemented in other types of interactive systems, including other types of network-based services that users access from user computing devices such as mobile phones, personal digital media players, in-car entertainment systems, televisions, set top boxes, audio visual receivers, etc.

As illustrated in FIG. 1, the electronic catalog system 110 includes one or more web servers 112 that respond to page requests received over the network 104 from user computing devices 102 (e.g., personal computers, portable computing devices, mobile phones, electronic book readers, PDAs, in-car entertainment systems, televisions, set top boxes, audio visual receivers, etc.). Those skilled in the art will appreciate that the network 104 may be any wired network, wireless network or combination thereof. In addition, the network 104 may be a personal area network, local area network, wide area network, cable network, satellite network, cellular telephone network, or combination thereof. In the illustrated embodiment, the network 104 is the Internet. Protocols and components for communicating via the Internet or any of the other aforementioned types of communication networks are well known to those skilled in the art of computer communications and thus, need not be described in more detail herein.

The catalog system 110 also includes a repository of catalog content 120. The catalog content may include, for example, media items themselves (e.g., music, videos, movies, audio books, electronic books, etc.), related images, product descriptions, user ratings and reviews of particular media items, price and availability data, etc. A search engine (not shown) enables users to search the catalog by submitting free-form search strings.

The catalog system 110 also includes a repository 118 of user account data for users who have created accounts with the system ("users"). User account data may include, for example, usernames, passwords, payment information, shipping information, item ratings, and wish lists. The repository 118 may also include various types of collected behavioral data reflective of the user's activity. For example, the behavioral data may include purchase or acquisition histories, search histories, consumption histories, comments regarding media items, reviews of media items and ratings of media items.

As shown in FIG. 1, the electronic catalog system 110 also includes a popularity prediction service 114 that predicts media items or creators thereof that are predicted to become popular based on user history of early adopters. Specifically, the popularity prediction service 114 inspects the consumption, acquisition, and interaction history of users identified as early adopters to locate obscure media items (or creators of obscure media items) common to multiple early adopters. As will be discussed in more detail with respect to FIG. 3, below, the popularity prediction service 114 further prioritizes or scores media items (and/or creators thereof) common to multiple early adopters to determine a likelihood of future popularity. The popularity prediction service 114 then makes information regarding media items and/or media item creators predicted to become popular available to users (e.g., in conjunction with the web server 112) and other components of the electronic catalog system 110.

In one instance, information regarding media items predicted to become popular can be made available to users via a display page provided by the web server 112. Such pages are illustratively displayed by a web browser (or other user interface) when a user computing device 102 visits the web site hosted by the electronic catalog system 110. These pages may enable a user to interact with various aspects of the electronic catalog system 110, such as by browsing for and acquiring media items, receiving information regarding media items, consuming media items directly from the electronic catalog system 110 (e.g., by streaming such media items), downloading media items to the user computing device 102, otherwise interacting with media items (e.g., by commenting on, reviewing, or rating a media item), and receiving recommendations regarding media items that may be of interest to a user (e.g., including media items or creators identified as potentially becoming popular in the future). One example of a detail page including a recommendation for a media item identified as potentially becoming popular in the future will be discussed with reference to FIG. 4, below.

The popularity prediction service 114 includes, and operates in conjunction with, an early adopter identification engine 116. The early adopter identification engine 116 is configured to identify, based on the interactions of users of the electronic catalog system 110, a subset of users that tend to consume popular media items before they become popular. These users are generally referred to herein as "early adopters." The early adopter identification engine 116 can identify such early adopters at least in part based on an analysis of current and past popular media items. For example, the early adopter identification engine 116 may aggregate user data for all or a threshold number of popular songs, and determine those users that acquired, consumed or interacted with the song prior to the song becoming popular. Users represented by this user data may then be ranked or scored according to a variety of metrics, including but not limited to the popularity of the relevant song, the time period during which the user acquired, consumed or interacted with the song, and the frequency of that consumption or interaction. As will be described in more detail below, these metrics may generally be assessed relative to the point at which a media item gained popularity, rather than relative to an initial offering of the media item or a release date of the media item. After scoring the identified users, the early adopter identification engine 116 may determine a set of such users that represent early adopters based on the user scores. One illustrative routine for identifying early adopters based on user data will be described below in more detail with respect to FIG. 2.

In some instances, the electronic catalog system 110 incentivizes or rewards identified early adopters. Illustratively, users identified as early adopters can be awarded special status within the electronic catalog system 110, such as a special title, designation or "badge" associated with the user. Such status may be viewable to the user and/or other users of the electronic catalog system 110 (e.g., with consent of the early adopter). In some such instances, other users of the electronic catalog system 110 may be enabled to view or track the consumption habits of early adopters. This may enable users to "follow" early adopters that tend to consume desirable music. Further, early adopters may be given financially or tangentially valuable rewards, such as gift certificates or credit usable on the electronic catalog system 110 for purchase of media content or other items. Provision of rewards to early adopters may incentivize users to seek out currently unpopular music, thereby increasing the user's exposure to the content available on the electronic catalog system 110.

In some embodiments, the system 110 can be configured differently than shown in FIG. 1. For example, the popularity prediction service 114 may be operated independently from the electronic catalog system 110 (e.g., on its own or associated with additional network-based services), or may be implemented without any connection to an electronic catalog system. Many variations and alternatives are possible, and no single component or group of components is essential or required to be present in every embodiment of the system 110.

The electronic catalog system 110 may also include functionality and components (not shown) for enabling users to perform various other types of functions, including but not limited to the following: (1) purchasing or acquiring media items selected from the electronic catalog, (2) creating wish lists of media items selected from the catalog, and searching for and viewing the wish lists of other users, (3) conducting keyword searches for specific media items, (4) browsing the catalog using a category-based browse tree, (5) creating personal profiles that are viewable by other users, (6) tagging specific catalog items, and (7) posting user reviews, reviews, and ratings of particular media items. In some embodiments, the electronic catalog system 110 may be associated with or combined with other catalog systems, such as systems for purchasing physical goods from one or more merchants. Still further, in some embodiments the electronic catalog system 110 may include one or more components configured to interact with other external systems, such as social networking systems. Illustratively, the electronic catalog system 110 may interact with such social networking systems in order to gather additional data regarding the popularity of media items and/or the interactions of early adopters. Illustrative systems and methods for interacting with a social networking system are described in more detail within U.S. Pat. No. 8,355,955 issued to Mirchandani et al., entitled "Method, Medium, and System for Adjusting Selectable Element Based on Social Networking Usage," which is hereby incorporated in its entirety.

Any one or more of the web server 112, the page template repository 112, the popularity prediction service 114, the early adopter identification engine 116, the user account and behavior data repository 118, and the catalog content 120 may be embodied in a plurality of components, each executing an instance of the respective page template repository 112, popularity prediction service 114, early adopter identification engine 116, user account and behavior data repository 118, and catalog content 120. A server or other computing component implementing any one of the page template repository 112, the popularity prediction service 114, the early adopter identification engine 116, the user account and behavior data repository 118, and the catalog content 120 may include a network interfaces, memories, processing units, and computer readable medium drives, all of which may communicate which each other may way of a communication bus. The network interfaces may provide connectivity over the network 104 and/or other networks or computer systems. The processing units may communicate to and from memory containing program instructions that the processing unit executes in order to operate the respective page template repository 112, popularity prediction service 114, early adopter identification engine 116, user account and behavior data repository 118, and catalog content 120. The processing units and memories may be selected in accordance with the processing requirements of embodiments of the present application. For example, where the electronic catalog system 110 is an international music distribution service including interaction information from millions of users, multiple processors and memories (e.g., from multiple computing devices working in conjunction) may be required to implement the functionalities of, e.g., the popularity prediction service 114). Memories may generally include RAM, ROM, other persistent and auxiliary memory, and/or any non-transitory computer-readable media.

Figure 2:
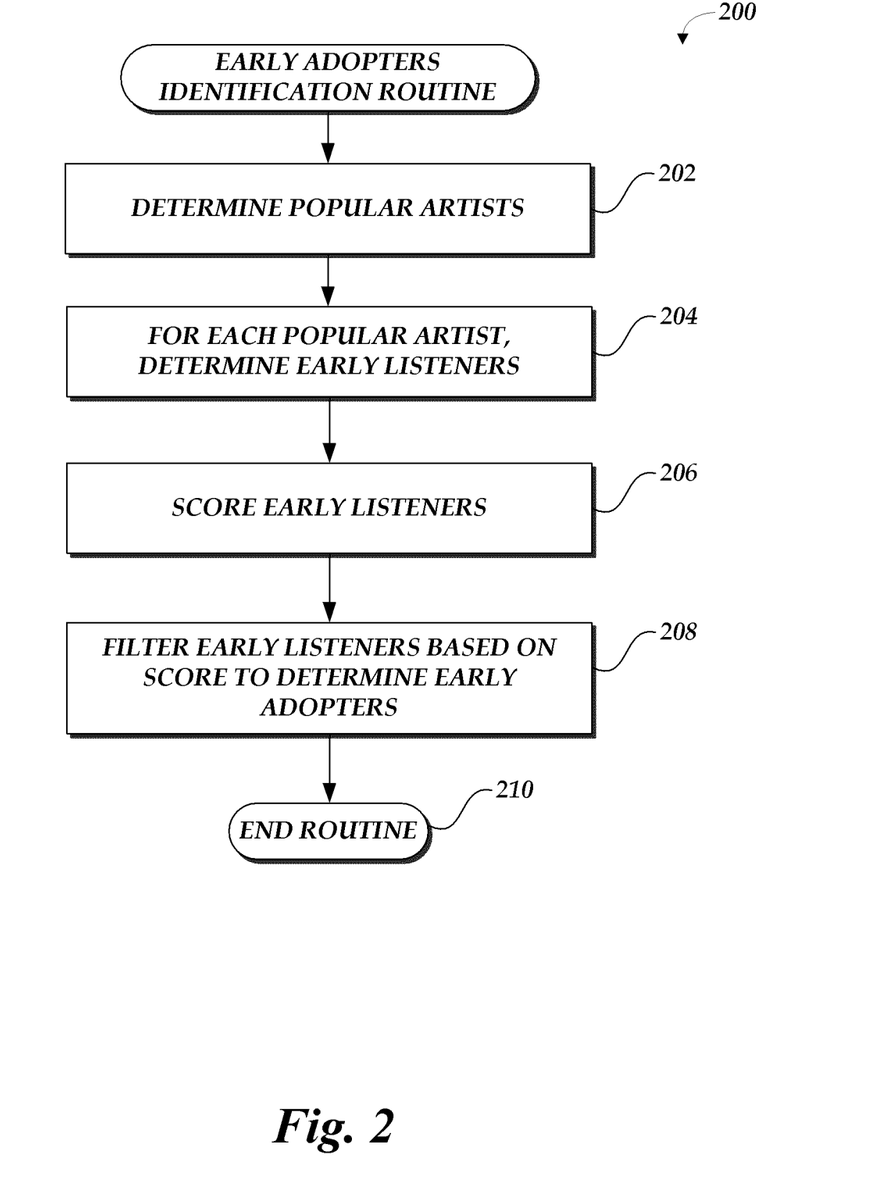
FIG. 2 illustrates an embodiment of a process for determining early adopters of popular media items based on popularity histories of such media items and based on acquisition and consumption histories of the early adopters.
Figure 3:
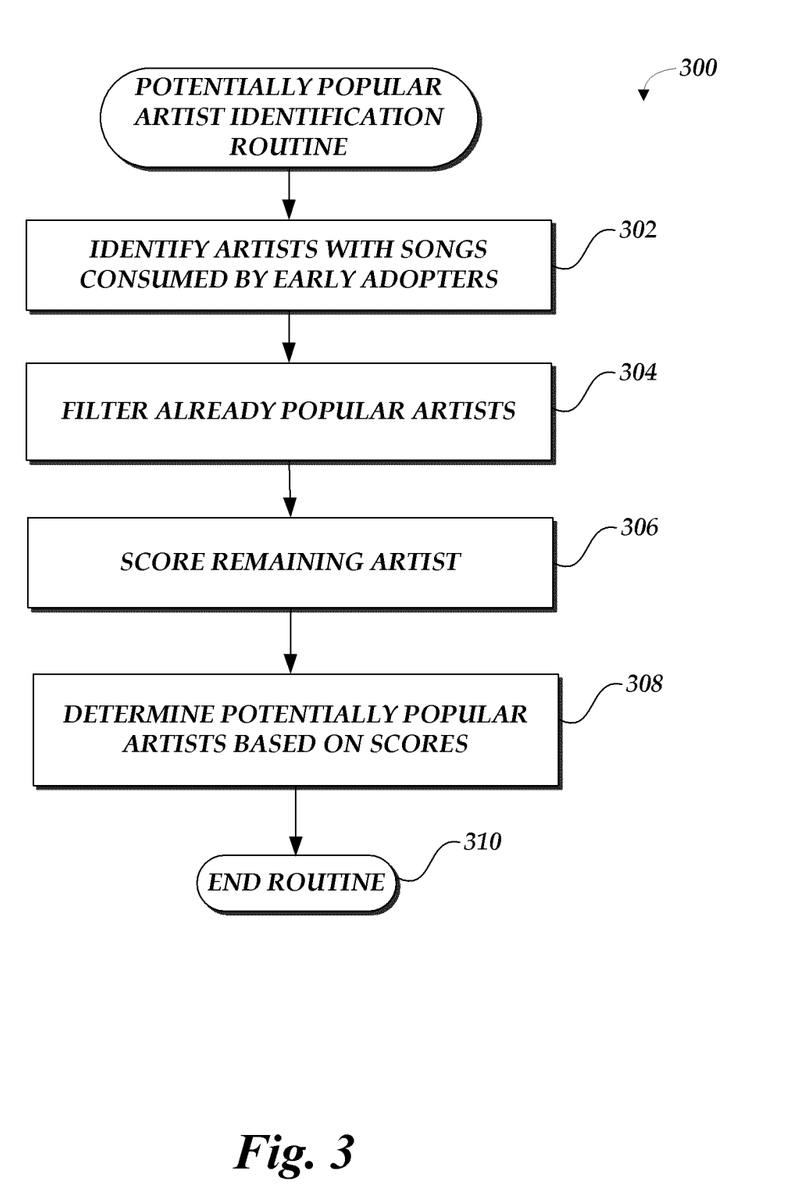
FIG. 3 illustrates an embodiment of a process for determining one or more obscure media items that are commonly acquired or consumed by early adopters, and that therefore may be likely to become popular in the future.

FIGS. 2 and 3 describe example routines for identifying creators of media items, such as musical artists, that are predicted to become popular in the future based on the interactions of early adopters. Specifically, FIG. 2 describes an illustrative routine 200 carried out by the early adopter identification engine 116 for identifying early adopters based on current or historically popular artists. FIG. 3 describes an illustrative routine 300 carried out by the popularity prediction service 114 for identifying artists that will potentially be popular in the future based on common acquisition and/or consumption of the artist's works by a number of early adopters. Though the illustrative routines of FIGS. 2 and 3 are described with respect to a musical artist, in some embodiments these routines may be utilized to identify creators of other media items, such as movies, books, or videos, that are predicted to become popular, or to identify media items themselves that are predicted to become popular.

With reference to FIG. 2, the illustrative routine 200 for identifying early adopters begins at block 202, where the early adopter identification engine 116 identifies a number of current or historical popular artists. Popular artists can be identified based on information associated with the electronic catalog system 110, on externally supplied information (e.g. information from a social networking system), or a combination thereof. For example, popular artists may be identified based on artists whose songs have been most consumed or purchased on the electronic catalog system 110 during a given period of time (e.g., day, week, month, year, etc.), artists with the highest revenue during such a time period, artists associated with the most incoming search queries during a time period, etc. As a further example, popular artists can be identified based at least in part on external data, including sales data (e.g., as may be provided by the Recording Industry Association of America (RIAA)) or popularity data (e.g., as may be provided by Billboard magazine or other publications in the form of popularity charts). As noted above, in some instances the electronic catalog system 110 may be configured to interact with other, external systems, such as a social networking system. In such instances, popularity data may further be based on user interactions on the social networking system, such as posts regarding an artist created by users of the social networking system, users "following" an artist on the social network system, or endorsements of an artist by users of the social networking system (e.g., by indication that a user "likes" an artist).

As still a further example, popular artists may be identified based on their relative popularity over a period of time. For example, an artists that experiences a relative drop in popularity over a given period of time may be less likely to become popular than an artist that experiences relative rise in popularity. In some instances, an artist's relative popularity may be referred to as a "popularity velocity." Similarly, in some instances popular artists may be identified based on their relative popularity velocity over a given period of time. For example, an artist with a large increase in popularity velocity may be more likely to be identified as popular. Relative popularity velocity over time may also be referred to as "popularity acceleration."

In some instances, threshold values may be applied to determine whether an artist is sufficiently popular. For example, artists may be deemed popular only if data associated with the artist satisfies an absolute threshold, such as volume of sales or consumption by users of the electronic catalog system 110. As a further example, artists may be deemed popular only if data associated with the artist satisfies a relative threshold, such as falling within the top number or percentage of sales with respect to other artists. One skilled in the art will appreciate that a combination of criteria may be used to identify a desired quantity of popular artists.

At block 204, for each popular artist previously identified, the early adopter identification engine 116 determines a number of users of the electronic catalog system 110 that acquired or consumed songs of the popular artist prior to the artist becoming popular. In some embodiments, to facilitate identification of these users, the early adopter identification engine 116 may identify a "breakout point" of the artist (e.g., a point at which the artist become sufficiently popular). This "breakout point" may be determined based on the same or similar criteria described above with respect to determining the popularity of an artist. For example, the early adopter identification engine 116 may determine a historical point at which the artist no longer satisfies a set of criteria for establishing a popular artist. In one example, the set of criteria for establishing a popular artist (e.g., as described above with reference to block 202) is the same as the criteria used to determine a breakout point. In another example, the criteria for establishing a popular artist may be different than the criteria used to establish a breakout point, e.g., such that the breakout point occurs earlier than the point at which the artist could be deemed popular.

After determining such a breakout point, the early adopter identification engine 116 can identify users of the electronic catalog system 110 that interacted with the given popular artist prior to the breakout point. Interactions with an artist may include, by way of non-limiting example, listening to songs by the artist, purchasing songs by the artist, searching for information regarding the artist on the electronic catalog system 110, commenting on the artist within the electronic catalog system 110, or otherwise displaying an interest in the artist on the electronic catalog system 110. Further, in some embodiments, interactions with the artist may occur on external systems. For example, where the electronic catalog system 110 is configured to interact with external social networking systems, interactions on these social networking systems can be utilized to establish a user as an early adopter.

At block 206, the early adopter identification engine 116 scores each user identified at block 204 to determine the extent to which each user is an "early adopter" of artists. Scoring is based, for example, on one or more metrics including but not limited to the frequency of consumption of the artist's songs by the user, number of purchases of the artist's work by the user, number of other interactions (e.g., comments, ratings, reviews, or searches) with the artist by the user. In one instance, each metric is weighted according to timing of the associated action by the user. For example, interaction with an artist by a user that occurs well prior to the breakout point of the artist may be weighted more highly interactions with the artist that occur near to the breakout point of the artist. In one instance, such weighting is proportional to the length of time between the interaction and the breakout point of the artist. In still more instances, scores of users may be based on additional criteria, such as the location of the user or demographics of the user (e.g., age, gender, etc.). Illustratively, users accessing the electronic catalog system 110 from specific geographic areas (e.g., areas that commonly identify popular artists prior to the artist becoming popular) may be scored more highly than users accessing the electronic catalog system 110 from other geographic areas.

After determining a score of each user, the early adopter identification engine 116 utilizes the determined scores to rank the users and identify a set of the users as "early adopters." In one instance, the early adopter identification engine 116 can identify early adopters based on an absolute score threshold, such that any user with a score satisfying the threshold is designated as an early adopter. In another embodiment, the early adopter identification engine 116 can identify early adopters based on a relative threshold, such that the top X number or X percentage of users scored are designated as early adopters. A combination of absolute and relative thresholds may also be utilized. Thereafter, the routine 200 may end at block 210. As described below, the early adopters identified by the routine 200 can thereafter be utilized to identify currently obscure artists that are likely to obtain popularity in the future.

Though the routine 200 is described with reference to all artists represented within the electronic catalog system 110, the routine 200 may alternatively be implemented to determine early adopters with respect to only a subset of artists. For example, the routine 200 may be executed with respect to artists within a specific genre to identify early adopters of the specific genre. Similarly, the routine 200 may be executed with respect to a specific geographic region, either to determine early adopters of artists associated with a specific region, to determine early adopters who are themselves within a specific region, or both. Accordingly, in some instances, the early adopter identification engine 116 can implement the routine 200 multiple times to determine early adopters associated with differing characteristics.

One skilled in the art will appreciate that routine 200 may include additional or alternative components. For example, as described above, in some instances early adopters may be granted rewards (e.g., a financial reward, a badge or other indicator, etc.). Accordingly, in these instances the routine 200 may include additional components (not shown in FIG. 2) to distribute such rewards to identified early adopters).

With reference to FIG. 3, the illustrative routine 300 for identifying artists predicted to become popular begins at block 302, where the popularity prediction service 114 identifies artists whose songs have been consumed or otherwise interacted with (e.g., by acquisition, commenting, searching, etc.) by early adopters (e.g., as identified by the routine 200 of FIG. 2). In one embodiment, block 302 includes collecting all interaction data of early adopters, and identifying each artist with which an early adopter interacted. In another embodiment, block 302 includes identifying only a subset of artists interacted with by early adopters, such as artists meeting a threshold interaction level. In this manner, artists associated with very low interaction rates (e.g., interaction by only a single early adopter) may be removed from further consideration by the routine 300.

Thereafter, at block 304, the popularity prediction service 114 filters already popular artists from further processing, in order to avoid identifying already popular artists as potentially becoming popular in the future. Metrics for identifying popularity of an artist are described in more detail above with respect to FIG. 2, but may include utilizing popularity information gathered within the electronic catalog system 110 (e.g., purchases, song consumption, ratings, etc.) as well as external information (e.g., record charts, record sales, etc.).

At block 306, the remaining identified artists may be scored based on the level of interaction of early adopters. Illustratively, scoring is based on a number of interactions with an identified artist across all early adopters. Accordingly, in one embodiment, the score of an artist is directly proportional to the aggregate number of interactions with the artists (or works of the artist) across all early adopters. As noted above, interactions may include playing a song of the artist, searching for an artist or song of the artist, commenting on, reviewing, or rating an artist, or otherwise indicating an interest in the art to the electronic catalog system 110. Interactions may occur on the electronic catalog system 110 itself, or via external systems (e.g., social networking systems).

In some instances, interactions of early adopters may be weighted, such that some interactions affect the score of an artist more heavily than others. Illustratively, commenting on an artist may be weighted more heavily than searching for an artist, while purchasing an artist's works may be weighted more heavily than consuming the artist's works. In still further embodiments, interactions of specific early adopters may be weighted based on characteristics of the early adopter. Illustratively, each interaction by an early adopter may be weighted based on a score or ranking of the early adopter (e.g., as determined in blocks 206 and 208 of FIG. 2, described above). The score of an identified artist may be based on any combination of the above, exclusively or in combination with other metrics.

Thereafter, at block 308, the popularity prediction service 114 utilizes the score of each artist to identify artists that are likely to become popular in the future. In one instance, the popularity prediction service 114 can predict the future popularity of artists based on an absolute score threshold, such that any artist with a score satisfying the threshold is predicted to become popular in the future. In another embodiment, the popularity prediction service 114 can predict the future popularity of artists based on a relative threshold, such that the top X number or X percentage of artists scored are predicted to become popular in the future. A combination of absolute and relative thresholds may also be utilized. Thereafter, the routine 300 may end at block 310. As will be described below, the artists predicted by the routine 300 to potentially become popular can thereafter be utilized to provide recommendations regarding the artists or artists' songs to users of the electronic catalog system 110.

Figure 4:
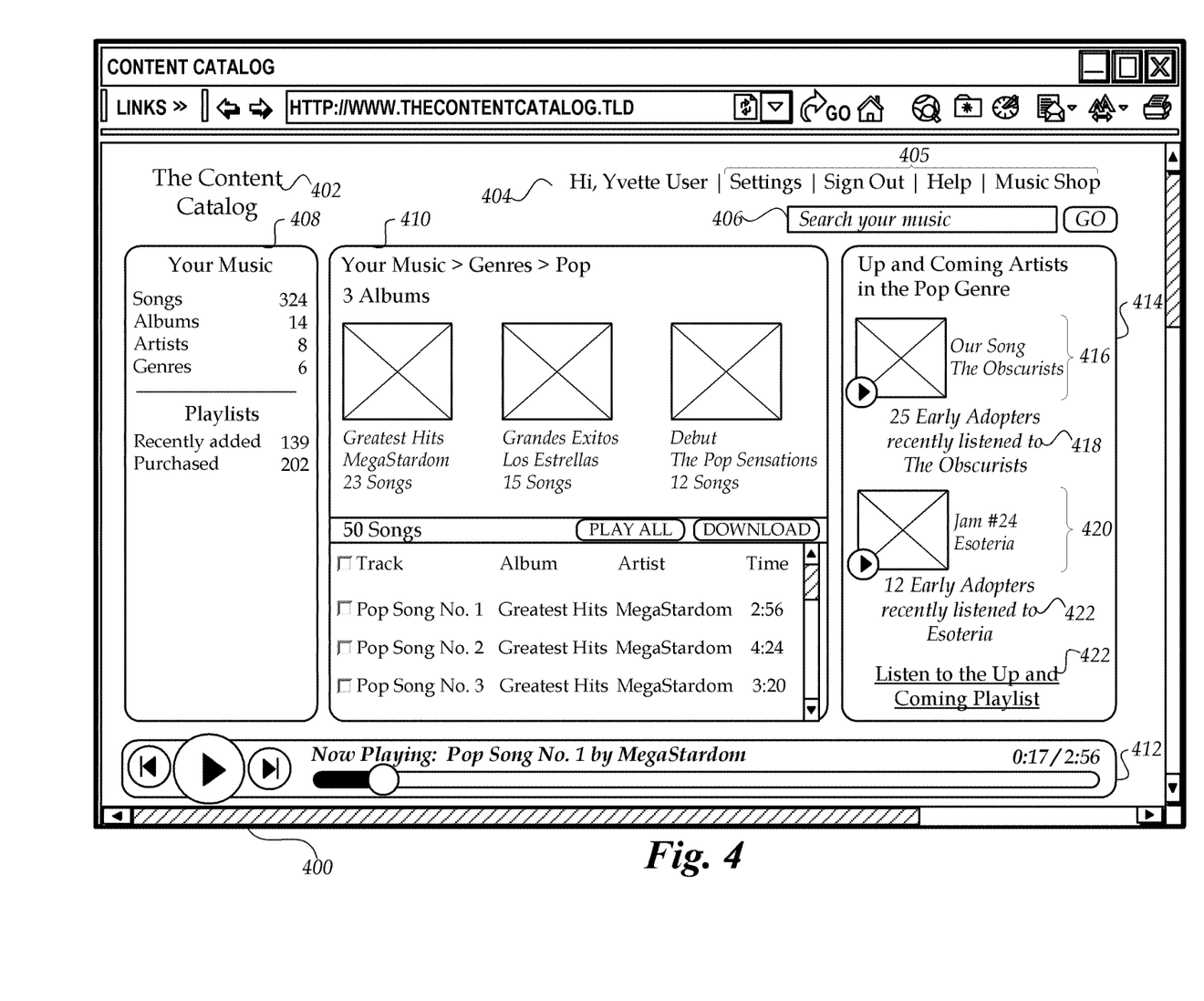
FIG. 4 illustrates an example format of a web page that may be generated by the electronic catalog system to enable users to browse for and consume media items. The web page of FIG. 4 may further provide users with recommendations for additional media items based on media items that have been commonly acquired or consumed by early adopters.

FIG. 4 illustrates an example of the format and content of a representative display page 400 (e.g., web page) that is generated by the electronic catalog system 110 and enables users to browse and consume media content, as well as receive recommendations regarding media items predicted to become popular in the future. The representative display page 400 is presented as it may appear, for example, in a web browser. Illustratively, the display page 400 is generated by the web server 112 of FIG. 1 using a repository of page templates 114. As shown in FIG. 4, the display page 400 provides information retrieved from the electronic catalog system 110, i.e., the "Content Catalog" 402 to "Yvette User" 404, an illustrative user accessing the "Content Catalog." The display page 400 further includes a set of navigation links 405 enabling Yvette User to navigate to other display pages of the Content Catalog, including display pages for editing user settings, exiting the Content Catalog, shopping for media content, etc., as well as a search input 406 enabling Yvette User to search for media items on the Content Catalog.

As shown in FIG. 4, the display page 400 enables Yvette User to interact with various media items available on the Content Catalog. While the display page 400 is described herein with reference to music and musical artists, the same or similar display pages may be used to display information regarding other forms of media items, such as books or videos. The display page 400 also includes a browsing portion 408, which enables Yvette User to select different modes of interacting with the display page 400, as well as a media information portion 410 displaying information regarding one or more media items. Specifically, the browsing portion 408 includes one or more links (e.g., "Songs," "Albums," "Artists") selectable by Yvette User to modify information shown within the media information portion 410. For example, selection of the "Songs" link within the browsing portion 408 modifies the media information portion 410 to reflect information regarding all or a subset of songs acquired, purchased, or accessible to Yvette User on the Content Catalog. Similarly, selection of the "Album," "Artist" or "Genre" links within the browsing portion 408 modifies the media information portion 410 to reflect information regarding all or a subset of media items corresponding to respective albums, artists, or genres acquired, purchased, or accessible to Yvette User on the Content Catalog. In the illustrative display page 400, the media information portion 410 reflects information regarding albums and songs accessible to Yvette User within the "Pop" genre. By interaction with the media information portion 410, Yvette User may select individual songs or albums for playback (e.g., directly from the Content Catalog) or download (e.g., for later consumption).

The display page 400 further includes a status bar 412 enabling Yvette User to consume media items, such as the songs reflected in the media information portion 410. Yvette User may select various portions of the status bar to begin, pause, or halt playback, to skip to other media items, or to change playback position within a current media item. As shown in FIG. 4, the status bar 412 further includes information regarding a currently played media item, such as the current playback position relative to the duration of the media item.

Still further, the display page 400 includes a recommendation portion 414 depicting information regarding one or more media items predicted to become popular by the Content Catalog (e.g., by implementation of the routine 300 of FIG. 3). Specifically, the recommendation portion 414 of FIG. 4 includes information regarding two obscure songs 416 and 418 that have been frequently interacted with by users identified as early adopters within the "pop" genre. Accordingly, each of these songs is currently associated with an artist who has not become popular in the "pop" genre, but who is predicted to potentially become popular in the future. The artists of these songs are therefore identified as "up and coming" artists the Content Catalog. By selection of the information regarding the songs 416 and 418, Yvette User can request playback of the respective songs 416 and 418 on the Content Catalog, thereby gaining exposure to the identified artists.

The recommendation portion 414 also includes additional information regarding the recommended songs that may be of interest to Yvette User. For example, information portions 418 and 422 reflect the number of early adopters that have listened to the artist associated with the respective songs 416 and 418. In addition, the recommendation portion 414 includes controls that enable Yvette User to further interact with media items by "up and coming" artists, such as link 422. Illustratively, selection of link 422 enable Yvette User to listen to a playlist populated with media items generated by artists that are predicted to become popular, and may display information regarding such a playlist within the media information portion 410. Accordingly, by interaction with the recommendation portion 414, Yvette User is enabled to view information regarding artists predicted to become popular in the future. The information may benefit Yvette User, by increasing the ease of discovering new artists and media, as well as the artist, by increasing exposure and consumption of their works.

Each of the processes, methods, and algorithms described in the preceding sections may be automated by a computer system that includes one or more computing devices, each of which includes a memory and a processor that includes digital logic circuitry. For example, the processes may be embodied in, and fully or partially automated by, code modules executed by one or more computers, computer processors, or machines configured to execute computer instructions. The code modules may be stored on any type of non-transitory computer-readable medium or computer storage device, such as hard drives, solid state memory, optical discs, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may also be implemented partially or wholly in application-specific circuitry. The results of the disclosed processes and process steps may be stored, persistently or otherwise, in any type of non-transitory computer storage such as, e.g., volatile or non-volatile storage. In other embodiments, the results of the disclosed process and process step may be stored in transitory computer storage, such as a signal. The popularity prediction service 114 may, for example, be implemented by a physical server that comprises one or more computing devices.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
    retrieving media interaction information reflecting user interaction with a set of popular media items, wherein popular media items are associated with satisfaction of a set of popularity criteria;
    determining a set of users that interacted with individual media items of the set of popular media items prior to popularity of respective individual media items, wherein the set of users are determined based at least in part on the media interaction information;
    assigning scores to individual users of the set of users, wherein a score of an individual user is based at least in part on a length of time between i) an initial interaction of the individual user with the respective individual media items and ii) a point in time at which the respective individual media items satisfied the set of popularity criteria;
    retrieving user interaction information reflecting interactions of the set of users with a set of media items not yet popular on a music distribution system;
    ranking the set of media items that are not yet popular based at least in part on the scores of the individual users and the user interaction information reflecting interactions of the set of users;
    generating, based on rankings of the set of media items, a recommendation to at least one user of the music distribution system for a media item of the set of media items that are not yet popular; and
    transmitting the recommendation to a computing device of the at least one user;
    wherein said method is performed entirely by a computer system that comprises one or more computing devices.

2. The computer-implemented method of claim 1, wherein the media item is at least one of a song, an album, a video, a book, a movie, or a collection thereof.

3. The computer-implemented method of claim 1, wherein popular media items are associated with at least one of current or historical satisfaction of the set of popularity criteria.

4. The computer-implemented method of claim 1 wherein the recommendation is transmitted via at least one of a display page output to the computing device of the at least one user or an electronic message transmitted to the computing device of the at least one user.

5. The computer-implemented method of claim 1, wherein the ranking of the set of media items is further based at least in part on at least one of a level of interaction with individual media items of the set of media items by individual users of the set of users, a location of a creator associated with individual media items of the set of media items, or a location of individual users of the set of users.

6. The computer-implemented method of claim 1, wherein the scores of individual users is further based at least in part on a number of interactions of an individual user of with respective popular media items of the set of popular media items.

7. A system comprising:
    a data store including media interaction information reflecting user interaction with a set of popular media items, wherein popular media items are associated with satisfaction of a set of popularity criteria;
    one or more processors in communication with the data store and configured with specific computer-executable instructions to:
    determine a set of users that interacted with individual media items of the set of popular media items prior to popularity of respective individual media items, wherein the set of users are determined based at least in part on the media interaction information;
    assign scores to individual users of the set of users, wherein a score of an individual user is based at least in part on a length of time between i) an initial interaction of the individual user with the respective individual media items and ii) a point in time at which the respective individual media items satisfied the set of popularity criteria;
    retrieve user interaction information reflecting interactions of the set of users with a set of media items not yet popular on a music distribution system;
    rank the set of media items that are not yet popular based at least in part on the scores of the individual users and the user interaction information reflecting interactions of the set of users;
    generate, based on rankings of the set of media items, a recommendation to at least one user of the music distribution system for at least one media item of the set of media items that are not yet popular; and
    transmit the recommendation to a computing device of the at least one user.

8. The system of claim 7, wherein the set of popularity criteria comprise at least one of a level of interaction with an individual media item, a level of interaction with a creator of the individual media item, an externally published popularity ranking of the creator, or reported sales of the creator by an external organization.

9. The system of claim 8, wherein the level of interaction with the creator includes at least one of a number of times users have consumed content items associated with the creator, viewed information regarding the creator or content items associated with the creator, searched for the creator or content items associated with the creator, commented on the creator or content items associated with the creator, reviewed the creator or content items associated with the creator, or rated the creator or content items associated with the creator.

10. The system of claim 8, wherein the level of interaction with the creator corresponds to interactions on a social networking system, and wherein the level of interaction with the creator includes at least one of a number of posts regarding the creator on the social networking system, a number of users following the creator on the social networking system, or a number of endorsements of the creator on the social networking system.

11. The system of claim 7, wherein the ranking of the set of media items is further based at least in part on at least one of a level of interaction with individual media items of the set of media items by individual users of the set of users, a location of a creator associated with individual media items of the set of media items, or a location of individual users of the set of users.

12. The system of claim 7, wherein the scores of individual users is further based at least in part on a number of interactions of an individual user of with respective popular media items of the set of popular media items.

13. A non-transitory computer-readable medium comprising computer-executable instructions for identifying media items predicted to become popular, wherein the computer-executable instructions, when executed by a computing system, cause the computing system to:
retrieve media interaction information reflecting user interaction with a set of popular media items, wherein popular media items are associated with satisfaction of a set of popularity criteria;
determine a set of users that interacted with individual media items of the set of popular media items prior to popularity of respective individual media items, wherein the set of users are determined based at least in part on the media interaction information;
assign scores to individual users of the set of users, wherein a score of an individual user is based at least in part on a length of time between i) an initial interaction of the individual user with the respective individual media items and ii) a point in time at which the respective individual media items satisfied the set of popularity criteria;
retrieve user interaction information reflecting interactions of the set of users with a set of media items not yet popular on a music distribution system;
rank the set of media items that are not yet popular based at least in part on the scores of the individual users and the user interaction information reflecting interactions of the set of users;
generate, based on rankings of the set of media items, a recommendation to at least one user of the music distribution system for at least one media item of the set of media items that are not yet popular; and
transmit the recommendation to a computing device of the at least one user.

14. The non-transitory computer-readable medium of claim 13, wherein the recommendation of the set of media items that are not yet popular corresponds to a playlist including the set of media items that are not yet popular.

15. The non-transitory computer-readable medium of claim 13, wherein the score of an individual user is further based at least in part on a geographic location associated with the individual user.

16. The non-transitory computer-readable medium of claim 13, wherein the one or more popular media items are associated with a specific genre of media item.

17. The non-transitory computer-readable medium of claim 13, wherein the set of popularity criteria include at least one of an absolute threshold value or a threshold value relative to popularity metrics of other media items.

18. The non-transitory computer-readable medium of claim 13, wherein the set of popularity criteria establish a required change in a popularity metric over a period of time.

19. The non-transitory computer-readable medium of claim 13, wherein the ranking of the set of media items is further based at least in part on at least one of a level of interaction with individual media items of the set of media items by individual users of the set of users, a location of a creator associated with individual media items of the set of media items, or a location of individual users of the set of users.

* * * * *